United States Patent
Crook et al.

(10) Patent No.: US 12,535,360 B2
(45) Date of Patent: Jan. 27, 2026

(54) NON-UNIFORMITY CORRECTION CALIBRATIONS IN INFRARED IMAGING SYSTEMS AND METHODS

(71) Applicant: Teledyne FLIR Commercial Systems, Inc., Goleta, CA (US)

(72) Inventors: Adam Crook, Goleta, CA (US); Julie R. Moreira, Santa Barbara, CA (US)

(73) Assignee: Teledyne FLIR Commercial Systems, Inc., Goleta, CA (US)

(*) Notice: Subject to any disclaimer, the term of this patent is extended or adjusted under 35 U.S.C. 154(b) by 632 days.

(21) Appl. No.: 17/886,372

(22) Filed: Aug. 11, 2022

(65) Prior Publication Data

US 2023/0046320 A1   Feb. 16, 2023

Related U.S. Application Data

(60) Provisional application No. 63/233,193, filed on Aug. 13, 2021, provisional application No. 63/233,184, filed on Aug. 13, 2021.

(51) Int. Cl.
*G01J 5/80* (2022.01)
*G06T 7/80* (2017.01)
(Continued)

(52) U.S. Cl.
CPC ... *G01J 5/80* (2022.01); *G06T 7/80* (2017.01); *H04N 5/33* (2013.01); *H04N 25/53* (2023.01);
(Continued)

(58) Field of Classification Search
CPC ............... G01J 5/80; G01J 2005/0077; G01J 2005/0092; G01J 1/44; G01J 2001/444;
(Continued)

(56) References Cited

U.S. PATENT DOCUMENTS 8,760,509 B2   6/2014   Schmidt et al.
10,542,193 B1*  1/2020   Marteney ............. H04N 25/674
(Continued)

FOREIGN PATENT DOCUMENTS

CN   103604503 A   2/2014

OTHER PUBLICATIONS

Chang et al., "Single-reference-based solution for two-point nonuniformity correction of infrared focal plane arrays", Infrared Physics & Technology, Sep. 2019, pp. 96-104, vol. 101, Elsevier B.V., Changchun, China, Abstract.
(Continued)

*Primary Examiner* — Eyob Hagos
(74) *Attorney, Agent, or Firm* — Hayes and Boone, LLP

(57) ABSTRACT

Techniques for facilitating non-uniformity correction calibrations are provided. In one example, an infrared imaging system includes an infrared imager and a logic device. The infrared imager is configured to capture a set of infrared images of a reference object. The reference object is substantially at a single temperature. The logic device is configured to initiate a run-time calibration of the infrared imager and generate a gain map based on the set of infrared images and an offset map associated with the infrared imager. Related devices and methods are also provided.

18 Claims, 3 Drawing Sheets

(51) Int. Cl.
  *H04N 5/33* (2023.01)
  *H04N 25/53* (2023.01)
  *H04N 25/63* (2023.01)
  *H04N 25/671* (2023.01)
  *G01J 5/00* (2022.01)

(52) U.S. Cl.
  CPC ........... *H04N 25/63* (2023.01); *H04N 25/671* (2023.01); *G01J 2005/0077* (2013.01); *G01J 2005/0092* (2013.01)

(58) Field of Classification Search
  CPC ............. G06T 7/80; G06T 2207/10048; G06T 2207/10144; G06T 5/50; H04N 5/33; H04N 25/53; H04N 25/63; H04N 25/671; H04N 25/674
  See application file for complete search history.

(56) References Cited

U.S. PATENT DOCUMENTS

| | | |
|---|---|---|
| 2009/0273675 A1 | 11/2009 | Jonsson |
| 2016/0065848 A1 | 3/2016 | LeBeau et al. |
| 2016/0198102 A1* | 7/2016 | Chahine ............... H04N 17/002 |
| | | 348/164 |
| 2021/0202238 A1* | 7/2021 | Wang ............... H01L 21/823431 |

OTHER PUBLICATIONS

Caner Calik et al., "A Study on Calibration Methods for Infrared Focal Plane Array Cameras", In Proceedings of the 13th International Joint Conference on Computer Vision Imaging and Computer Graphics Theory and Applications (VISIGRAPP 2018)—vol. 4: VISAPP, Jan. 27, 2018, pp. 219-226, Scitepress, Madeira, Portugal.
Chen et al., "Nonuniformity Correction for Variable-Integration-Time Infrared Camera" IEEE Photonics Journal; Dec. 2018, 12 pages, vol. 10, No. 6, IEEE, New Jersey, United States of America.
Kumar, Ajay, "Sensor Non Uniformity Correction Algorithms and its Real Time Implementation;" Defence Science Journal, Nov. 2013, pp. 589-598, vol. 63, No. 6, Desidoc, Dehradun, India.

* cited by examiner

NON-UNIFORMITY CORRECTION CALIBRATIONS IN INFRARED IMAGING SYSTEMS AND METHODS

CROSS REFERENCE TO RELATED APPLICATIONS

This application claims priority to and the benefit of U.S Provisional Patent Application No. 63/233,184 filed Aug. 13, 2021 and entitled "NON-UNIFORMITY CORRECTION CALIBRATIONS IN INFRARTED IMAGING SYSTEMS AND METHODS," and U.S. Provisional Patent Application No. 63/233,193 filed Aug. 13, 2021 and entitled "NON-UNIFORMITY CORRECTION CALIBRATIONS IN INFRARED IMAGING SYSTEMS AND METHODS," which are incorporated herein by reference in their entireties.

TECHNICAL FIELD

One or more embodiments relate generally to imaging and more particularly, for example, to non-uniformity correction (NUC) calibrations in infrared imaging systems and methods.

BACKGROUND

Imaging systems may include an array of detectors arranged in rows and columns, with each detector functioning as a pixel to produce a portion of a two-dimensional image. For example, an individual detector of the array of detectors captures an associated pixel value. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, an infrared imaging system includes an infrared imager and a logic device. The infrared imager is configured to capture a set of infrared images of a reference object. The reference object is substantially at a single temperature. The logic device is configured to initiate a run-time calibration of the infrared imager and generate a gain map based on the set of infrared images and an offset map associated with the infrared imager In one or more embodiments, a method includes initiating a run-time calibration of an imager of an imaging device. The method further includes capturing, by an imager of an imaging device, a set of infrared images of a reference object. The reference object is substantially at a single temperature. The method further includes generating a gain map based on the set of infrared images and an offset map associated with the imager.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
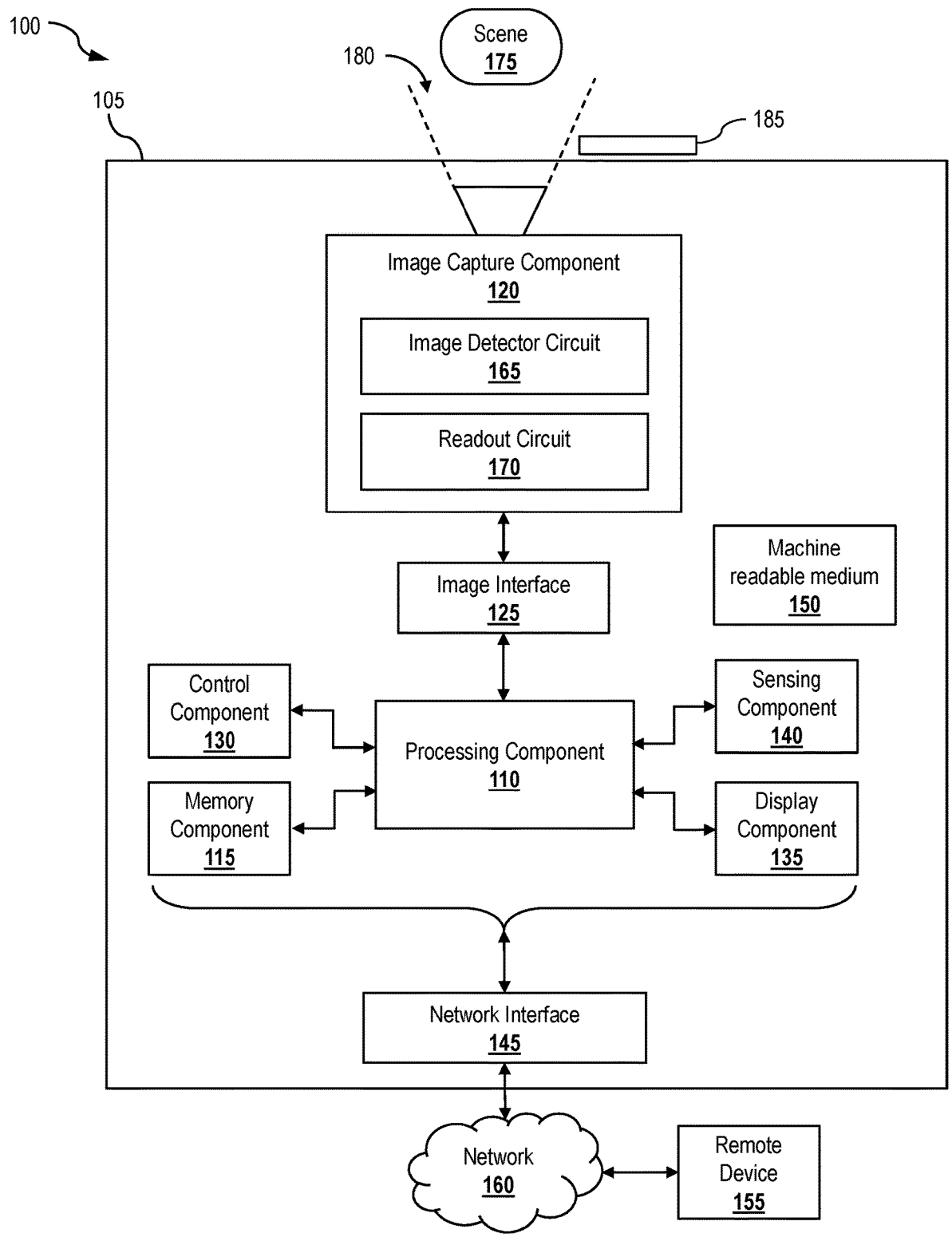
FIG. 1 illustrates a block diagram of an example imaging system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided to facilitate calibrations related to non-uniformity correction (NUC) in infrared imaging systems and methods. An infrared imaging system (e.g., a thermal camera) may be used to capture infrared image data associated with a scene using an image sensor device (e.g., a detector array of an FPA). The image sensor device includes detectors (e.g., also referred to as detector pixels, detector elements, or simply pixels). Each detector pixel may detect incident EM radiation and generate infrared image data indicative of the detected EM radiation of the scene. In some embodiments, the image sensor array is used to detect infrared radiation (e.g., thermal infrared radiation). For pixels of an infrared image (e.g., thermal infrared image), each output value of a pixel may be represented/provided as and/or correspond to a temperature, digital count value, percentage of a full temperature range, or generally any value that can be mapped to the temperature. For example, a digital count value of 13,000 output by a pixel may represent a temperature of 160° C. As such, the captured infrared image data may indicate or may be used to determine a temperature of objects, persons, and/or other features/aspects in the scene.

The image sensor device may be calibrated (e.g., factory calibrated) to determine non-uniformity correction terms (e.g., including gain correction terms and offset correction terms) and, at a later time, update these non-uniformity correction terms. The calibrations may mitigate instability occurring in infrared detectors (e.g., thermal infrared detectors such as mid-wave infrared detectors and/or long-wave infrared detectors). In some aspects, such calibrations may mitigate instability even for thermal infrared detectors operated at higher/high operating temperatures (e.g., relative to detectors operating at around liquid-nitrogen temperatures such as 80 K). As an example, such high operating temperature detectors may have operating temperatures greater than 120 K, such as in a range between 120 K and 150 K. In some cases, if not mitigated, such instability may prevent static, factory non-uniformity corrections containing gain and offset maps (e.g., gain and offset terms per pixel) from being effective for fixed pattern noise reduction (e.g., over time and/or over multiple cooldown cycles).

The image sensor device may be factory calibrated to obtain NUC terms. In some cases, factory calibration may utilize two sources. Such a calibration may achieve two different flux levels using two different temperatures. The two different temperatures may be from two temperature sources. Images and/or parameters derived from the images may be captured of each of the temperature sources. Various temperature maps and/or parameters derived therefrom may be used to determine NUC maps, such as gain maps, offset maps, and/or bad pixel maps. The various temperature maps, NUC maps, and/or others determined or derivable from the source calibration may be stored (e.g., in non-volatile memory) for use in subsequent calibrations, such as subsequent calibrations performed during run-time/in-the-field using a single reference source as further described herein.

The image sensor device may subsequently be calibrated using a single reference object/source (e.g., using only a single reference object/source) to update the NUC terms. The calibration may be or may include a flat-field correction (FFC) process. The FFC process may be performed in digital imaging to remove artifacts from images that are caused by variations in pixel-to-pixel output of the image sensor device (e.g., variations between individual detectors) and/or by distortions in an optical path. In some embodiments, such later calibrations may be utilized to update gain correction terms and may be referred to as gain correction calibrations. The calibrations may capture images of the reference object. In some cases, the single reference object may be a shutter of the imaging system (e.g., an integrated shutter available as part of a mechanical design of the imaging system) that may be used to selectively block radiation from reaching the image sensor device. In some cases, the single temperature source may be an external source/object. An external source/object may be referred to as, or referred to as providing, an external shutter or a virtual shutter. By way of non-limiting examples, the external source/object may include a case or holster of the imaging system, a lens cap, a cover, a wall of a room, or other suitable object/surface.

In some embodiments, the calibration using only a single reference object may be performed to update the gain maps using the reference object, thus allowing updates to be determined in-the-field/on-the-fly in various camera designs (e.g., which typically have available only a single temperature source in run-time operation) without using two temperatures. In this regard, according to various embodiments, to update a gain correction with the single reference object, a residual fixed pattern (FPN) against the reference object with offset correction (e.g., non-volatile offset correction) applied may be considered to be gain error only (e.g., assumes offset correction is stable/static). With the residual FPN attributed to gain error, images captured of the reference object with the offset correction applied may be used to generate the gain correction terms. Gain correction calibrations against the single reference object may mitigate instability and resulting residual FPN in run-time. The residual FPN source may be considered to exhibit solely gain instability such that only gain rather than offset corrections are updated with a single temperature source (e.g., the single reference object/source).

Calibration using the two sources may be performed at the factory (e.g., as part of a manufacturing process prior to delivery to a customer), whereas run-time/in-the-field calibration using a single temperature source may be performed (e.g., by an operator of the image sensor device) to adjust/update the factory calibrated and tested NUC terms (e.g., gain and offset maps). In this regard, in some cases, the two-source calibration may be performed as a one-time calibration. The various temperature maps, NUC maps, integration times, and/or other parameters determined during the run-time calibration may be stored (e.g., in volatile memory) for use in calibration-related computations and/or image processing/correction computations.

Although various embodiments for calibration are described primarily with respect to infrared imaging, calibration using methods and systems disclosed herein may be utilized in conjunction with devices and systems such as infrared imaging systems, imaging systems having visible-light and infrared imaging capability, short-wave infrared (SWIR) imaging systems, light detection and ranging (LIDAR) imaging systems, radar detection and ranging (RADAR) imaging systems, millimeter wavelength (MMW) imaging systems, ultrasonic imaging systems, X-ray imaging systems, microscope systems, mobile digital cameras, video surveillance systems, video processing systems, or other systems or devices that may need to obtain image data in one or multiple portions of the EM spectrum.

Referring now to the drawings, FIG. 1 illustrates a block diagram of an example imaging system 100 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of EM radiation and provides representative data (e.g., one or more still image frames or video image frames). The imaging system 100 may include an imaging device 105. By way of non-limiting examples, the imaging device 105 may be, may include, or may be a part of an infrared camera, a visible-light camera, a tablet computer, a laptop, a personal digital assistant (PDA), a mobile device, a desktop computer, or other electronic device. The imaging device 105 may include a housing (e.g., a camera body) that at least partially encloses components of the imaging device 105, such as to facilitate compactness and protection of the imaging device 105. For example, the solid box labeled 105 in FIG. 1 may represent a housing of the imaging device 105. The housing may contain more, fewer, and/or different components of the imaging device 105 than those depicted within the solid box in FIG. 1. In an embodiment, the imaging system 100 may include a portable device and may be incorporated, for example, into a vehicle or a non-mobile installation requiring images to be stored and/or displayed. The vehicle may be a land-based vehicle (e.g., automobile, truck), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 100. In another example, the imaging system 100 may be coupled to various types of fixed locations (e.g., a home security mount, a campsite or outdoors mount, or other location) via one or more types of mounts.

The imaging system 105 includes, according to one implementation, a logic device 110, a memory component 115, an image capture component 120 (e.g., an imager, an image sensor device), an image interface 125, a control component 130, a display component 135, a sensing component 140, and/or a network interface 145. The logic device 110, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device, one or more memories for storing executable instructions (e.g., software, firmware, or other instructions), and/or or any other appropriate combination of processing device and/or memory to execute instructions to perform any of the various operations described herein. The logic device 110 may be configured, by hardwiring, executing software instructions, or a combination of both, to perform various operations discussed herein for embodiments of the disclosure. The logic device 110 may be configured to interface and communicate with the various other components (e.g., 115, 120, 125, 130, 135, 140, 145, etc.) of the imaging system 100 to perform such operations. For example, the logic device 110 may be configured to process captured image data received from the imaging capture component 120, store the image data in the memory component 115, and/or retrieve stored image data from the memory component 115. In one aspect, the logic device 110 may be configured to perform various system control operations (e.g., to control communications and operations of various components of the imaging system 100) and other image processing operations (e.g., debayering, sharpening, color correction, offset correction, bad pixel replacement, data conversion, data transformation, data compression, video analytics, etc.).

The memory component 115 includes, in one embodiment, one or more memory devices configured to store data and information, including infrared image data and information. The memory component 115 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the logic device 110 may be configured to execute software instructions stored in the memory component 115 so as to perform method and process steps and/or operations. The logic device 110 and/or the image interface 125 may be configured to store in the memory component 115 images or digital image data captured by the image capture component 120. In some embodiments, the memory component 115 may include non-volatile memory to store various NUC maps and/or other parameters and/or maps determined or derivable from factory calibration (e.g., using two temperature sources) and/or run-time/in-field calibration. In some embodiments, the memory component 115 may include volatile memory to store various temperature maps, NUC maps (e.g., gain maps), and/or other parameters and/or maps determined or derivable from run-time/in-field calibration.

In some embodiments, a separate machine-readable medium 150 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 150 may be portable and/or located separate from the imaging device 105, with the stored software instructions and/or data provided to the imaging device 105 by coupling the machine-readable medium 150 to the imaging device 105 and/or by the imaging device 105 downloading (e.g., via a wired link and/or a wireless link) from the machine-readable medium 150. It should be appreciated that various modules may be integrated in software and/or hardware as part of the logic device 110, with code (e.g., software or configuration data) for the modules stored, for example, in the memory component 115.

The imaging device 105 may be a video and/or still camera to capture and process images and/or videos of a scene 175. In this regard, the image capture component 120 of the imaging device 105 may be configured to capture images (e.g., still and/or video images) of the scene 175 in a particular spectrum or modality. The image capture component 120 includes an image detector circuit 165 (e.g., a visible-light detector circuit, a thermal infrared detector circuit) and a readout circuit 170 (e.g., an ROIC). For example, the image capture component 120 may include an IR imaging sensor (e.g., IR imaging sensor array) configured to detect IR radiation in the near, middle, and/or far IR spectrum and provide IR images (e.g., IR image data or signal) representative of the IR radiation from the scene 175. For example, the image detector circuit 165 may capture (e.g., detect, sense) IR radiation with wavelengths in the range from around 700 nm to around 2 mm, or portion thereof. For example, in some aspects, the image detector circuit 165 may be sensitive to (e.g., better detect) SWIR radiation, mid-wave IR (MWIR) radiation (e.g., EM radiation with wavelength of 2 µm to 5 µm), and/or long-wave IR (LWIR) radiation (e.g., EM radiation with wavelength of 7 µm to 14 µm), or any desired IR wavelengths (e.g., generally in the 0.7 µm to 14 µm range). In other aspects, the image detector circuit 165 may capture radiation from one or more other wavebands of the EM spectrum, such as visible light, ultraviolet light, and so forth.

The image detector circuit 165 may capture image data (e.g., infrared image data) associated with the scene 175. To capture a detector output image, the image detector circuit 165 may detect image data of the scene 175 (e.g., in the form of EM radiation) received through an aperture 180 of the imaging device 105 and generate pixel values of the image based on the scene 175. An image may be referred to as a frame or an image frame. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns.

The detector output image may be, or may be considered, a data structure that includes pixels and is a representation of the image data associated with the scene 175, with each pixel having a pixel value that represents EM radiation emitted or reflected from a portion of the scene 175 and received by a detector that generates the pixel value. Based on context, a pixel may refer to a detector of the image detector circuit 165 that generates an associated pixel value or a pixel (e.g., pixel location, pixel coordinate) of the detector output image formed from the generated pixel values. In one example, the detector output image may be an infrared image (e.g., thermal infrared image). For a thermal infrared image (e.g., also referred to as a thermal image), each pixel value of the thermal infrared image may represent a temperature of a corresponding portion of the scene 175. In another example, the detector output image may be a visible-light image.

In an aspect, the pixel values generated by the image detector circuit 165 may be represented in terms of digital count values generated based on the electrical signals obtained from converting the detected radiation. For example, in a case that the image detector circuit 165 includes or is otherwise coupled to an analog-to-digital (ADC) circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 165 (e.g., an IR image detector circuit) is associated with higher digital count values and higher temperatures.

The readout circuit 170 may be utilized as an interface between the image detector circuit 165 that detects the image data and the logic device 110 that processes the detected image data as read out by the readout circuit 170, with communication of data from the readout circuit 170 to the logic device 110 facilitated by the image interface 125. An image capturing frame rate may refer to the rate (e.g., detector output images per second) at which images are detected/output in a sequence by the image detector circuit 165 and provided to the logic device 110 by the readout circuit 170. The readout circuit 170 may read out the pixel values generated by the image detector circuit 165 in accordance with an integration time (e.g., also referred to as an integration period).

In various embodiments, a combination of the image detector circuit 165 and the readout circuit 170 may be, may include, or may together provide an FPA. In some aspects, the image detector circuit 165 may be a thermal image detector circuit that includes an array of microbolometers, and the combination of the image detector circuit 165 and the readout circuit 170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometers may absorb incident IR radiation and produce a corresponding change in temperature in the microbolometers. The change in temperature is associated with a corresponding change in resistance of the microbolometers. With each microbolometer functioning as a pixel, a two-dimensional image or picture representation of the incident IR radiation can be generated by translating the changes in resistance of each microbolometer into a time-multiplexed electrical signal. The translation may be performed by the ROIC. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the image capture component 120 may include one or more optical components and/or one or more filters. The optical component(s) may include one or more windows, lenses, mirrors, beamsplitters, beam couplers, and/or other components to direct and/or focus radiation to the image detector circuit 165. The optical component(s) may include components each formed of material and appropriately arranged according to desired transmission characteristics, such as desired transmission wavelengths and/or ray transfer matrix characteristics. The filter(s) may be adapted to pass radiation of some wavelengths but substantially block radiation of other wavelengths. For example, the image capture component 120 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the image capture component 120 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 120 may include an IR imaging sensor having an FPA of detectors responsive to IR radiation including near infrared (NIR), SWIR, MWIR, LWIR, and/or very-long wave IR (VLWIR) radiation. In some other embodiments, alternatively or in addition, the image capture component 120 may include a complementary metal oxide semiconductor (CMOS) sensor or a charge-coupled device (CCD) sensor that can be found in any consumer camera (e.g., visible light camera).

In some embodiments, the imaging system 100 includes a shutter 185. The shutter 185 may be operated to selectively inserted into an optical path between the scene 175 and the image capture component 120 to expose or block the aperture 180. In some cases, the shutter 185 may be moved (e.g., slid, rotated, etc.) manually (e.g., by a user of the imaging system 100) and/or via an actuator (e.g., controllable by the logic device 110 in response to user input or autonomously, such as an autonomous decision by the logic device 110 to perform a calibration of the imaging device 105). When the shutter 185 is outside of the optical path to expose the aperture 180, the electromagnetic radiation from the scene 175 may be received by the image detector circuit 165 (e.g., via one or more optical components and/or one or more filters). As such, the image detector circuit 165 captures images of the scene 175. The shutter 185 may be referred to as being in an open position or simply as being open. When the shutter 185 is inserted into the optical path to block the aperture 180, the electromagnetic radiation from the scene 175 is blocked from the image detector circuit 165. As such, the image detector circuit 165 captures images of the shutter 185. The shutter 185 may be referred to as being in a closed position or simply as being closed. In some cases, the shutter 185 may block the aperture 185 during a calibration process, in which the shutter 185 may be used as a uniform blackbody (e.g., a substantially uniform blackbody). For example, the shutter 185 may be used as a single temperature source or substantially single temperature source. In some cases, the shutter 185 may be temperature controlled to provide a temperature controlled uniform black body (e.g., to present a uniform field of radiation to the image detector circuit 165). For example, in some cases, a surface of the shutter 185 imaged by the image detector circuit 165 may be implemented by a uniform blackbody coating. In some cases, such as for an imaging device without a shutter or with a broken shutter or as an alternative to the shutter 185, a case or holster of the imaging device 105, a lens cap, a cover, a wall of a room, or other suitable object/surface may be used to provide a uniform blackbody (e.g., substantially uniform blackbody) and/or a single temperature source (e.g., substantially single temperature source). Thus, for example, the shutter 185 may be used with the image capture component 120 to a perform a NUC process, such as a flat field correction process set forth in U.S. patent application Ser. No. 12/391,156 filed Feb. 23, 2009, which is incorporated herein by reference in its entirety.

Other imaging sensors that may be embodied in the image capture component 120 include a photonic mixer device (PMD) imaging sensor or other time of flight (ToF) imaging sensor, LIDAR imaging device, RADAR imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 120 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 125 may include, in some embodiments, appropriate input ports, connectors, switches, and/or circuitry configured to interface with external devices (e.g., a remote device 155 and/or other devices) to receive images (e.g., digital image data) generated by or otherwise stored at the external devices. In an aspect, the image interface 125 may include a serial interface and telemetry line for providing metadata associated with image data. The received images or image data may be provided to the logic device 110. In this regard, the received images or image data may be converted into signals or data suitable for processing by the logic device 110. For example, in one embodiment, the image interface 125 may be configured to receive analog video data and convert it into suitable digital data to be provided to the logic device 110.

The image interface 125 may include various standard video ports, which may be connected to a video player, a video camera, or other devices capable of generating standard video signals, and may convert the received video signals into digital video/image data suitable for processing by the logic device 110. In some embodiments, the image interface 125 may also be configured to interface with and receive images (e.g., image data) from the image capture component 120. In other embodiments, the image capture component 120 may interface directly with the logic device 110.

The control component 130 includes, in one embodiment, a user input and/or an interface device, such as a rotatable knob (e.g., potentiometer), push buttons, slide bar, keyboard, and/or other devices, that is adapted to generate a user input control signal. The logic device 110 may be configured to sense control input signals from a user via the control component 130 and respond to any sensed control input signals received therefrom. The logic device 110 may be configured to interpret such a control input signal as a value, as generally understood by one skilled in the art. In one embodiment, the control component 130 may include a control unit (e.g., a wired or wireless handheld control unit) having push buttons adapted to interface with a user and receive user input control values. In one implementation, the push buttons and/or other input mechanisms of the control unit may be used to control various functions of the imaging device 105, such as calibration initiation and/or related control, shutter control, autofocus, menu enable and selection, field of view, brightness, contrast, noise filtering, image enhancement, and/or various other features.

The display component 135 includes, in one embodiment, an image display device (e.g., a liquid crystal display (LCD)) or various other types of generally known video displays or monitors. The logic device 110 may be configured to display image data and information on the display component 135. The logic device 110 may be configured to retrieve image data and information from the memory component 115 and display any retrieved image data and information on the display component 135. The display component 135 may include display circuitry, which may be utilized by the logic device 110 to display image data and information. The display component 135 may be adapted to receive image data and information directly from the image capture component 120, logic device 110, and/or image interface 125, or the image data and information may be transferred from the memory component 115 via the logic device 110. In some aspects, the control component 130 may be implemented as part of the display component 135. For example, a touchscreen of the imaging device 105 may provide both the control component 130 (e.g., for receiving user input via taps and/or other gestures) and the display component 135 of the imaging device 105.

The sensing component 140 includes, in one embodiment, one or more sensors of various types, depending on the application or implementation requirements, as would be understood by one skilled in the art. Sensors of the sensing component 140 provide data and/or information to at least the logic device 110. In one aspect, the logic device 110 may be configured to communicate with the sensing component 140. In various implementations, the sensing component 140 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 140 may represent conventional sensors as generally known by one skilled in the art for monitoring various conditions (e.g., environmental conditions) that may have an effect (e.g., on the image appearance) on the image data provided by the image capture component 120.

In some implementations, the sensing component 140 (e.g., one or more sensors) may include devices that relay information to the logic device 110 via wired and/or wireless communication. For example, the sensing component 140 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the logic device 110 can use the information (e.g., sensing data) retrieved from the sensing component 140 to modify a configuration of the image capture component 120 (e.g., adjusting a light sensitivity level, adjusting a direction or angle of the image capture component 120, adjusting an aperture, etc.). The sensing component 140 may include a temperature sensing component to provide temperature data (e.g., one or more measured temperature values) various components of the imaging device 105, such as the image detection circuit 165 and/or the shutter 185. By way of non-limiting examples, a temperature sensor may include a thermistor, thermocouple, thermopile, pyrometer, and/or other appropriate sensor for providing temperature data.

In some embodiments, various components of the imaging system 100 may be distributed and in communication with one another over a network 160. In this regard, the imaging device 105 may include a network interface 145 configured to facilitate wired and/or wireless communication among various components of the imaging system 100 over the network 160. In such embodiments, components may also be replicated if desired for particular applications of the imaging system 100. That is, components configured for same or similar operations may be distributed over a network. Further, all or part of any one of the various components may be implemented using appropriate components of the remote device 155 (e.g., a conventional digital video recorder (DVR), a computer configured for image processing, and/or other device) in communication with various components of the imaging system 100 via the network interface 145 over the network 160, if desired. Thus, for example, all or part of the logic device 110, all or part of the memory component 115, and/or all of part of the display component 135 may be implemented or replicated at the remote device 155. In some embodiments, the imaging system 100 may not include imaging sensors (e.g., image capture component 120), but instead receive images or image data from imaging sensors located separately and remotely from the logic device 110 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the logic device 110 may be combined with the memory component 115, image capture component 120, image interface 125, display component 135, sensing component 140, and/or network interface 145. In another example, the logic device 110 may be combined with the image capture component 120, such that certain functions of the logic device 110 are performed by circuitry (e.g., a processor, a microprocessor, a logic device, a microcontroller, etc.) within the image capture component 120.

Figure 2:
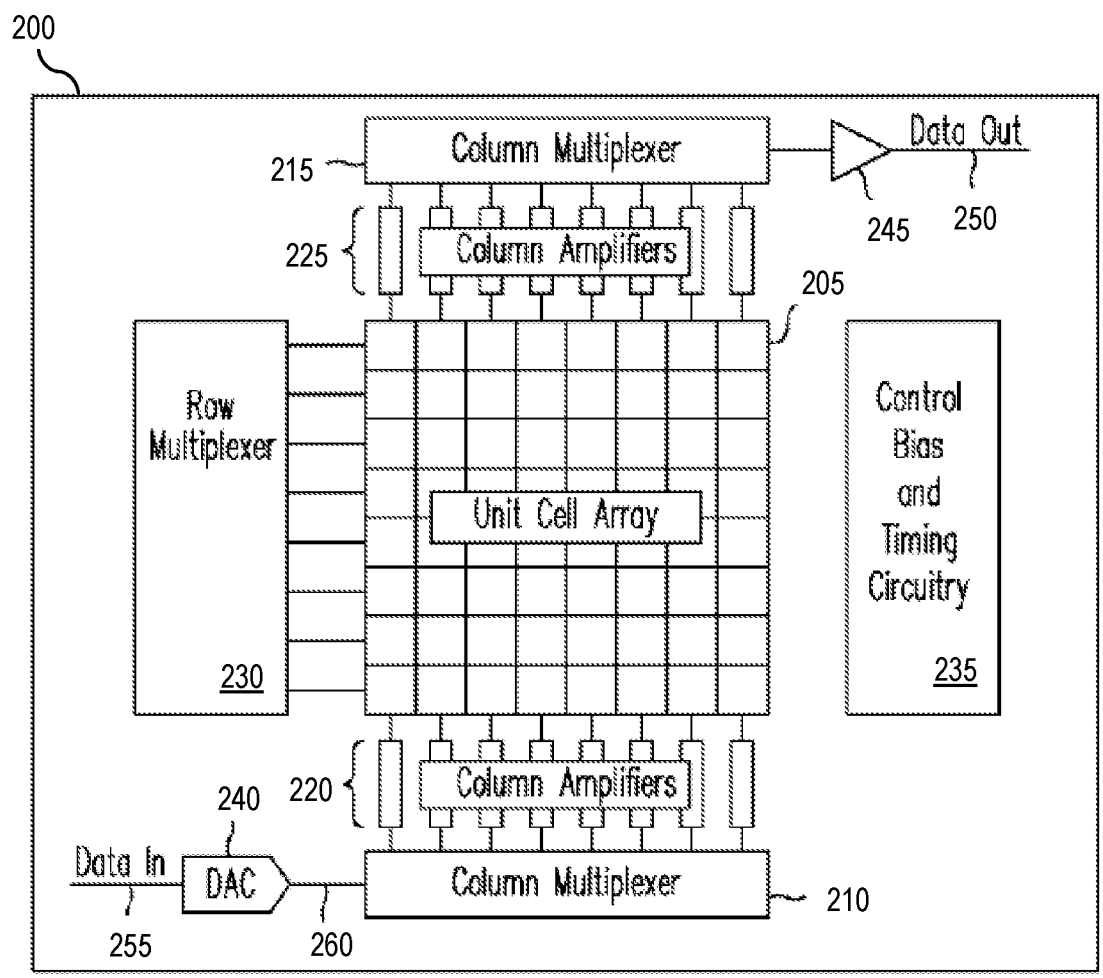
FIG. 2 illustrates a block diagram of an example image sensor assembly in accordance with one or more embodiments of the present disclosure.

FIG. 2 illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be an FPA, for example, implemented as the image capture component 120 of FIG. 1.

The image sensor assembly 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. In some aspects, operations of and/or pertaining to the unit cell array 205 and other components may be performed according to a system clock and/or synchronization signals (e.g., line synchronization (LSYNC) signals). The unit cell array 205 includes an array of unit cells. In an aspect, each unit cell may include a detector (e.g., a pixel) and interface circuitry. The interface circuitry of each unit cell may provide an output signal, such as an output voltage or an output current, in response to a detection signal (e.g., detection current, detection voltage) provided by the detector of the unit cell. The output signal may be indicative of the magnitude of EM radiation received by the detector and may be referred to as image pixel data or simply image data. The column multiplexer 215, column amplifiers 220, row multiplexer 230, and data output buffer 245 may be used to provide the output signals from the unit cell array 205 as a data output signal on a data output line 250. The output signals on the data output line 250 may be provided to components downstream of the image sensor assembly 200, such as processing circuitry (e.g., the logic device 110 of FIG. 1), memory (e.g., the memory component 115 of FIG. 1), display device (e.g., the display component 135 of FIG. 1), and/or other component to facilitate processing, storage, and/or display of the output signals. The data output signal may be an image formed of the pixel values for the image sensor assembly 200. In this regard, the column multiplexer 215, the column amplifiers 220, the row multiplexer 230, and the data output buffer 245 may collectively provide an ROIC (or portion thereof) of the image sensor assembly 200. In an aspect, the interface circuitry may be considered part of the ROIC, or may be considered an interface between the detectors and the ROIC. In some embodiments, components of the image sensor assembly 200 may be implemented such that the unit cell array 205 and the ROIC may be part of a single die.

The column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array 205 traverses to get to the column multiplexer 215. As another example, the column amplifiers 225 may include an ADC for converting analog signals to digital signals (e.g., to obtain digital count values). These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., visible-light, IR light) incident on the detectors of the unit cells. In an aspect, the control bias and timing circuitry 235 may be, may include, or may be a part of, a logic circuit.

The control bias and timing circuitry 235 may generate control signals for addressing the unit cell array 205 to allow access to and readout of image data from an addressed portion of the unit cell array 205. The unit cell array 205 may be addressed to access and readout image data from the unit cell array 205 row by row, although in other implementations the unit cell array 205 may be addressed column by column or via other manners.

The control bias and timing circuitry 235 may generate bias values and timing control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. For example, the DAC 240 may drive digital control signals (e.g., provided as bits) to appropriate analog signal levels for the unit cells. In some technologies, a digital control signal of 0 or 1 may be driven to an appropriate logic low voltage level or an appropriate logic high voltage level, respectively. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the logic device 110 and/or image capture component 120 of FIG. 1.

In an embodiment, the image sensor assembly 200 may be implemented as part of an imaging device (e.g., the imaging device 105). In addition to the various components of the image sensor assembly 200, the imaging device may also include one or more processors, memories, logic, displays, interfaces, optics (e.g., lenses, mirrors, beamsplitters), and/or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as non-uniformity correction (e.g., flat-field correction or other calibration technique), spatial and/or temporal filtering, and/or other operations. The images (e.g., processed images) may be stored in memory (e.g., external to or local to the imaging system) and/or displayed on a display device (e.g., external to and/or integrated with the imaging system). The various components of FIG. 2 may be implemented on a single chip or multiple chips. Furthermore, while the various components are illustrated as a set of individual blocks, various of the blocks may be merged together or various blocks shown in FIG. 2 may be separated into separate blocks.

It is noted that in FIG. 2 the unit cell array 205 is depicted as an 8×8 (e.g., 8 rows and 8 columns of unit cells. However, the unit cell array 205 may be of other array sizes. By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 205 may represent a pixel.

For a given imaging device (e.g., the imaging device 105), a factory calibration, such as a two temperature source calibration, may be performed with desired preset settings (e.g., integration time, sync mode, windowing, image orientation, and black body flood sources) to generate a standard gain map, offset map, and/or bad pixel map. In some embodiments, determination and storage (e.g., in non-volatile memory) of such calibration results may facilitate subsequent calibrations, including those using only a single reference source, to adjust/update NUC terms to allow for effective correction (e.g., fixed pattern noise reduction) over time.

Upon start-up of the imaging device (e.g., the image capture component 120 of the imaging device 105), NUC maps (e.g., gain maps, offset maps, and/or bad pixel maps stored in non-volatile memory of or otherwise accessible to the imaging device 105) may be applied in an image processing pipeline until a calibration is performed to update the NUC maps. In some embodiments, a run-time/in-the-field calibration may be performed to update the gain map used in an image processing pipeline by the imaging device for gain correction (e.g., as part of NUC correction). In some aspects, the updated gain map may be generated based on the offset map obtained during the factory calibration. Such a calibration may occur automatically (e.g., such as based on a time elapsed since a previous single-source calibration), upon user initiation, at start-up of the imaging device and/or components thereof, due to a NUC table switch (e.g., based on detector temperature), and/or other triggering event dependent on application and/or user preference. Conventional calibration techniques may utilize images of a shutter or external source and to adjust/update only offset terms. Using various embodiments, calibrations in which the offset terms are static and the gain terms are updated may allow for higher stability over time and/or cooldown cycle (e.g., relative to conventional techniques, such as those in which only offset terms are adjusted). In some cases, such calibrations may exhibit no deleterious effects when performed soon after (e.g., immediately after) a two temperature source calibration and/or when used to generate a gain correction based on low levels of residual fixed pattern noise. In some aspects, the imaging device 105 may allow the user to select whether to calibrate using the reference object calibration according to one or more embodiments herein or to calibrate using conventional techniques.

Figure 3:
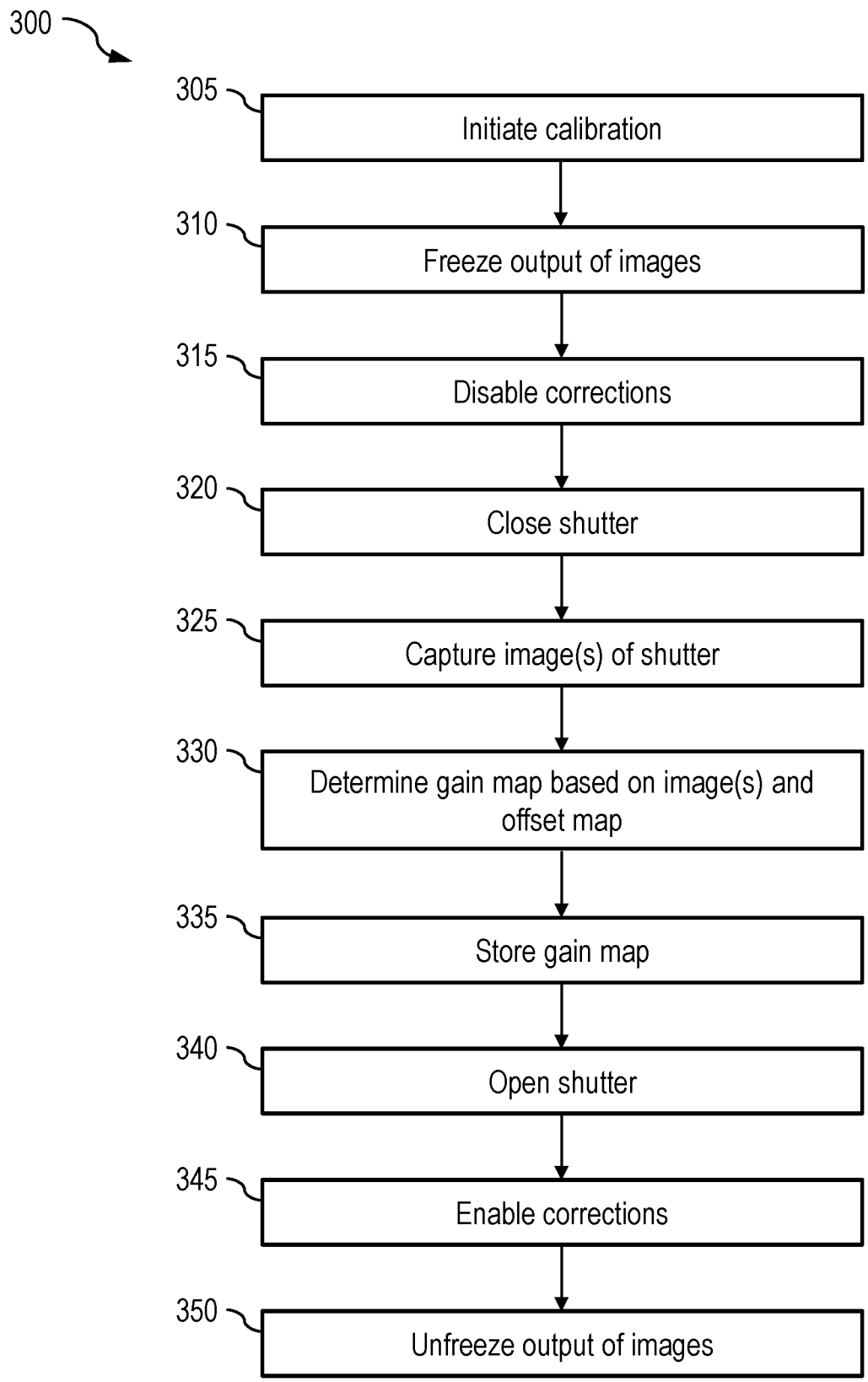
FIG. 3 illustrates a flow diagram of an example process for facilitating calibration in accordance with one or more embodiments of the present disclosure.

FIG. 3 illustrates a flow diagram of an example process 300 for facilitating calibration using a single reference object/source in accordance with one or more embodiments of the present disclosure. Although the process 300 is primarily described herein with reference to the imaging system 100 of FIG. 1 for explanatory purposes, the process 300 can be performed in relation to other systems for facilitating calibration. Note that one or more operations in FIG. 3 may be combined, omitted, and/or performed in a different order as desired. In some cases, the operations shown in FIG. 3 may be performed in the field. In some embodiments, the process 300 may be performed to update gain terms at some time after one or more previous calibrations (e.g., factory calibration(s) and/or in-the-field calibration(s)) have been performed by the imaging device 105.

At block 305, the imaging device 105 (e.g., the logic device 110) initiates a calibration. In some aspects, the imaging device 105 may initiate the calibration in response to user input/command, autonomously (e.g., periodically and/or in response to a predetermined threshold amount of time having passed since a previous calibration), in response to a NUC table switch, and/or in response to another triggering event dependent on application and/or user preference.

At block 310, the imaging device 105 (e.g., the logic device 110) freezes (e.g., disables or stops updating) output of images (e.g., static images and/or video formed of a sequence of images) provided to the display component 135 and/or the network interface 145. At block 315, the imaging device 105 (e.g., the logic device 110) disables non-uniformity correction or captures images before corrections are applied in an image processing pipeline of the imaging device 105.

At block 320, a reference object is positioned in a field of view of the imaging device 105 (e.g., the image detector circuit 165). The reference object may be at a known temperature (e.g., accurately measured and/or controllable temperature) and provide a uniform black body. In this regard, the reference object may be used as a single temperature source or substantially single temperature source. In some cases, the reference object may be a shutter of the imaging device 105 (e.g., an integrated shutter of the imaging device 105, such as the shutter 185) that is closed to block the image detector circuit 165. The logic device 110 may control an actuator to close the shutter or the user may manually close the shutter (e.g., by manually controlling the actuator or manually closing the shutter). In some cases, the reference source may be an object external to image detector circuit 165 (e.g., to cover the entirety of the field of view of the image detector circuit 165). Such an external object may be referred to as, or referred to as providing, an external shutter. In an aspect, providing of the reference object to block the imaging device 105 may be referred to as a shutter event. In some cases, the display component 135 of the imaging device 105 may prompt the user to confirm closing of the shutter over the image detector circuit 165.

At block 325, the imaging device 105 (e.g., the image capture component 120) captures a set of images (e.g., one or more thermal images) of the reference object. The image (s) may be captured using an integration time value $T_{intCurrNUC}$ for a current preset/NUC table (e.g., stored in non-volatile memory). In a case that multiple images (e.g., a sequence of images) are captured, the imaging device 105 (e.g., the logic device 110) may generate an image $I_{shutterFFC}$ by averaging some or all of the captured images. The image $I_{shutterFFC}$ may be referred to as an average image or an average frame associated with the reference object. A pixel (i, j) of the image $I_{shutterFFC}$ may be denoted as $I_{shutterFFC}(i, j)$ or $I_{shutterFFCi,j}$. For example, a pixel (i,j) of each of the captured images may be averaged to determine a corresponding pixel (i,j) of the image $I_{shutterFFC}$, in which $0 \le i \le M-1$ and $0 \le j \le N-1$ where M is the number of rows of the image $I_{shutterFFC}$ and N is the number of columns of the image $I_{shutterFFC}$ (or equivalently the number of rows of detectors and the number of columns of detectors, respectively, of the image detector circuit 165). In some cases, one or more pixel values from one or more captured images may be ignored when determining the average value of each pixel (i,j) of the image $I_{shutterFFC}$. For example, if six images are captured at block 325 and a particular pixel of one of the images significantly differs from values associated with corresponding pixels of the remaining five images, the pixel value of the one image may skew the average pixel value if the pixel value is not ignored. In a case that a single image of the reference object is captured, the single image is the image $I_{shutterFFC}$. The image $I_{shutterFFC}$ may provide a fixed pattern noise associated with the image detector circuit 165 of the imaging device 105. In some cases, the imaging device 105 (e.g., the logic device 110) may determine an average pixel value shutterFFCMean (e.g., also denoted as mean($I_{shutterFFC}$)) associated with the image $I_{shutterFFC}$ by averaging the pixel values of the image $I_{shutterFFC}$. In an aspect, such an average pixel value may be referred to as an array mean or an array average.

At block 330, the imaging device 105 (e.g., the logic device 110) determines a gain map $I_{gainFFC}$, which may be referred to as an updated gain map (e.g., relative to an original factory calibrated gain map $I_{gain}$ or gain map from another run-time calibration). The gain map $I_{gainFFC}$ may be based on the image $I_{shutterFFC}$ and an offset map associated with the image capture component 120. The updated gain map may be determined based on a fixed pattern noise between the shutter event and the offset map. In an aspect, the offset map (e.g., original offset map) may be determined during factory calibration and stored (e.g., in non-volatile memory of or otherwise accessible to the imaging device 105). In some cases, the original offset may include original gain terms due to a pipeline order. In this regard, the residual fixed pattern may be determined using the original offset with the raw capture against the shutter 185 (e.g., the one or more images captured at block 325. Residual non-uniformities may be considered gain-only errors, in which the gain map (e.g., for storage in volatile memory) is updated whereas the offset map remains static.

In some cases, each pixel (i,j) of the gain map $I_{gainFFC}$ may be determined as follows:

$$I_{gainFFC}(i, j) = \frac{shutterFFCMean - I_{offset}(i, j)}{I_{shutterFFC}(i, j)} \quad \text{Equation (1)}$$

where $I_{offset}$ is an offset map. The offset map may be determined during factory calibration and stored (e.g., in non-volatile memory of or otherwise accessible to the imaging device 105). In an embodiment, the calibration associated with the process 300 leaves the offset map $I_{offset}$ unchanged (e.g., the offset map $I_{offset}$ is a static parameter/map).

At block 335, the imaging device 105 (e.g., the logic device 110) stores the gain map $I_{gainFFC}$. In some cases, the gain map $I_{gainFFC}$ may be stored in memory (e.g., volatile memory or non-volatile memory) and used for gain correction.

At block 340, the reference object is removed (e.g., the shutter is opened) from the field of view of the imaging device 105 (e.g., the image detector circuit 165) to allow the image detector circuit 165 to be exposed to the scene 175. When the reference object is a shutter (e.g., the shutter 185), the shutter is opened to allow the image detector circuit 165 to be exposed to the scene 175. At block 345, the imaging device 105 (e.g., the logic device 110) enables non-uniformity correction of images captured by the imaging device 105. At block 350, the imaging device 105 (e.g., the logic device 110) unfreezes (e.g., enables or begins updating) the output of images provided to the display component 135 and/or the communication interface 145.

Following blocks 340, 345, and 350, the calibration is concluded. Thus, following block 350, the imaging device 105 may be used to capture (e.g., may return to capturing) images of the scene 175 and apply gain corrections using the gain map $I_{gainFFC}$ obtained from the calibration and/or offset corrections using the offset map $I_{offset}$. In some cases, the pipeline order associated with non-uniformity correction may be provided by:

$$S_{corrected}(i,j)=S_{raw}(i,j) \times I_{gain}(i,j)+I_{offset}(i,j) \quad \text{Equation (2)}$$

in which $S_{raw}(i,j)$ is the signal/raw pixel value from the image capture component 120 (e.g., the FPA) without any image processing or calibration applied, $S_{corrected}(i, j)$ is the signal/raw pixel value with corrections applied, $I_{gain}(i,j)$ is the gain map applied to $S_{raw}(i,j)$, and $I_{offset}(i, j)$ is the offset map applied to $S_{raw}(i,j)$. For example, the offset term in the pipeline may include gain multiplication and removal of the mean. In an aspect, after calibration according to the process 300, the gain map $I_{gain}$ may be or may be based on the gain map $I_{gainFFC}$ determined at block 330, which may then be replaced/updated with a different gain map following a subsequent calibration (e.g., subsequent single reference object calibration), and the offset map $I_{offset}$ remains unchanged (e.g., from prior to the calibration).

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method comprising:
   initiating a run-time calibration of an imager of an imaging device;
   capturing, by the imager, a set of infrared images of a reference object, wherein the reference object is substantially at a single temperature, and wherein the reference object is a single temperature shutter of the imaging device or a single temperature external source; and
   generating a gain map based on the set of infrared images and an offset map associated with the imager, wherein the offset map is a factory calibrated offset map, and wherein run-time calibrations of the imager leave the offset map unchanged and are performed to generate gain maps that are updated relative to a factory calibrated gain map.

2. The method of claim 1, wherein the reference object is the single temperature shutter of the imaging device.

3. The method of claim 2, further comprising:
   moving the single temperature shutter to a closed position to present a surface of the single temperature shutter to the imager, wherein the surface is substantially at the single temperature; and
   storing the gain map in a volatile memory, wherein the run-time calibration comprises the moving, the capturing, the generating, and the storing.

4. The method of claim 1, wherein the run-time calibration leaves the offset map unchanged, and wherein the run-time calibration comprises the capturing and the generating.

5. The method of claim 1, further comprising determining a mean pixel value associated with the set of infrared images, wherein the gain map is further based on the mean pixel value.

6. The method of claim 1, further comprising averaging the set of infrared images to obtain an average infrared image, wherein the gain map is further based on the average infrared image.

7. The method of claim 6, further comprising determining a mean of the average infrared image, wherein the gain map is further based on the mean.

8. The method of claim 7, wherein the gain map is based on the average infrared image and a difference between the mean and the offset map.

9. The method of claim 1, further comprising after the run-time calibration:
capturing, by the imager, an infrared image; and
applying the gain map and the offset map on the infrared image to obtain a non-uniformity corrected image, wherein the imaging device is a portable thermal camera.

10. An infrared imaging system comprising:
an infrared imager configured to capture a set of infrared images of a reference object, wherein the reference object is substantially at a single temperature, and wherein the reference object is a single temperature shutter of the infrared imaging system or a single temperature external source; and
a logic device configured to initiate a run-time calibration of the infrared imager and generate a gain map based on the set of infrared images and an offset map associated with the infrared imager, wherein the offset map is a factory calibrated offset map, and wherein the logic device is configured to initiate run-time calibrations of the infrared imager that leave the offset map unchanged and that generate gain maps that are updated relative to a factory calibrated gain map.

11. The infrared imaging system of claim 10, wherein the reference object is the single temperature shutter of the infrared imaging system, and wherein the logic device is further configured to:
move the single temperature shutter to a closed position to present a surface of the single temperature shutter to the infrared imager, wherein the surface provides a uniform black body substantially at the single temperature, and wherein the run-time calibration comprises moving the single temperature shutter, capturing the set, and generating the gain map.

12. The infrared imaging system of claim 10, wherein the run-time calibration leaves the offset map unchanged, and wherein the run-time calibration comprises capturing the set of infrared images and generating the gain map.

13. The infrared imaging system of claim 10, wherein the logic device is further configured to determine a mean pixel value associated with the set of infrared images, and wherein the gain map is further based on the mean pixel value.

14. The infrared imaging system of claim 10, wherein the logic device is further configured to average the set of infrared images to obtain an average infrared image, and wherein the gain map is further based on the average infrared image.

15. The infrared imaging system of claim 14, wherein the logic device is further configured to determine a mean of the average infrared image, and wherein the gain map is further based on the mean.

16. The infrared imaging system of claim 10, wherein after the run-time calibration:
the infrared imager is further configured to capture an infrared image; and
the logic device is further configured to apply the gain map and the offset map on the infrared image to obtain a non-uniformity corrected image.

17. The infrared imaging system of claim 10, further comprising a memory, wherein the logic device is further configured to update gain terms stored in the memory with the gain map.

18. The infrared imaging system of claim 10, wherein the infrared imaging system is a portable thermal camera.

* * * * *